United States Patent
Zhao et al.

(10) Patent No.: US 12,464,164 B2
(45) Date of Patent: **\*Nov. 4, 2025**

(54) FURTHER IMPROVEMENT FOR CHROMA MODE CODING

(71) Applicant: TENCENT AMERICA LLC, Palo Alto, CA (US)

(72) Inventors: Liang Zhao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 18/331,516

(22) Filed: Jun. 8, 2023

(65) Prior Publication Data

US 2023/0319309 A1 Oct. 5, 2023

Related U.S. Application Data

(63) Continuation of application No. 17/873,761, filed on Jul. 26, 2022, now Pat. No. 11,758,186, which is a
(Continued)

(51) Int. Cl.
*H04N 19/593* (2014.01)
*H04N 19/176* (2014.01)
*H04N 19/186* (2014.01)

(52) U.S. Cl.
CPC ......... *H04N 19/593* (2014.11); *H04N 19/176* (2014.11); *H04N 19/186* (2014.11)

(58) Field of Classification Search
CPC .. H04N 19/105; H04N 19/159; H04N 19/176; H04N 19/186; H04N 19/593; H04N 19/70
See application file for complete search history.

(56) References Cited

U.S. PATENT DOCUMENTS

| 9,363,511 B2 | 6/2016 | Zhang et al. |
| 10,284,860 B1 | 5/2019 | Zhao et al. |

(Continued)

FOREIGN PATENT DOCUMENTS

| WO | WO-2018127624 A1 * | 7/2018 | .......... H04N 19/159 |
| WO | 20200072781 A1 | 4/2020 | |

(Continued)

OTHER PUBLICATIONS

"Wide Angular Intra Prediction for Versatile Video Coding"—Liang Zhao, Xin Zhao, Shan Liu, Xiang Li, Jani Lainema, Gagan Rath, Fabrice Urban, Fabien Racapé; 2019 Data Compression Conference (DCC). (Year: 2019).*

(Continued)

*Primary Examiner* — Mainul Hasan
(74) *Attorney, Agent, or Firm* — Sughrue Mion, PLLC

(57) ABSTRACT

A method, system, and non-transitory computer readable medium is provided for decoding video data. Video data comprising a chroma component having a first nominal angle and first delta angles and a luma component having a second nominal angle and second delta angles is received, wherein the first delta angles are dependent on the second delta angles. The first delta angle values corresponding to the first delta angles are parsed or derived based at least on second delta values corresponding to the second delta angles, wherein the first delta angle values are derived from one or more nominal angles associated with one or more sample positions corresponding to one or more luma blocks. A prediction mode associated with the chroma component based on a nominal mode of a corresponding luma block is entropy-coded. The video data is decoded based on the first delta angle values corresponding to the first delta angles.

20 Claims, 6 Drawing Sheets

Related U.S. Application Data continuation of application No. 16/993,876, filed on Aug. 14, 2020, now Pat. No. 11,432,006.

(56) References Cited

U.S. PATENT DOCUMENTS

| | | | |
|---|---|---|---|
| 10,284,866 B1 | 5/2019 | Zhao et al. | |
| 10,404,980 B1 | 9/2019 | Zhao et al. | |
| 10,419,754 B1 | 9/2019 | Zhao et al. | |
| 10,432,929 B2 | 10/2019 | Zhao et al. | |
| 10,469,845 B1 | 11/2019 | Zhao et al. | |
| 10,491,893 B1 | 11/2019 | Zhao et al. | |
| 10,567,752 B2 | 2/2020 | Zhao et al. | |
| 11,432,006 B2* | 8/2022 | Zhao | H04N 19/593 |
| 2013/0266064 A1* | 10/2013 | Zhang | H04N 19/11 |
| | | | 375/240.12 |
| 2014/0198855 A1* | 7/2014 | Sole Rojals | H04N 19/59 |
| | | | 375/240.16 |
| 2016/0050422 A1* | 2/2016 | Rosewarne | H04N 19/11 |
| | | | 375/240.12 |
| 2019/0124339 A1* | 4/2019 | Young | H04N 19/159 |
| 2019/0356909 A1* | 11/2019 | Lainema | H04N 19/147 |
| 2020/0021817 A1* | 1/2020 | Van der Auwera | H04N 19/11 |
| 2020/0404325 A1* | 12/2020 | Ramasubramonian | |
| | | | H04N 19/593 |
| 2021/0297668 A1* | 9/2021 | Racape | H04N 19/105 |
| 2022/0264120 A1* | 8/2022 | Wang | H04N 19/70 |

FOREIGN PATENT DOCUMENTS

| | | | | |
|---|---|---|---|---|
| WO | WO-2020072249 A1 * | 4/2020 | | H04N 19/176 |
| WO | WO-2020072781 A1 * | 4/2020 | | H04N 19/176 |
| WO | WO-2020160482 A1 * | 8/2020 | | H04N 19/157 |

OTHER PUBLICATIONS

"Luma Mapping with Chroma Scaling in Versatile Video Coding"—Taoran Lu, Fangjun Pu, Peng Yin, Sean McCarthy, Walt Husak, Tao Chen Edouard Francois; 2020 Data Compression Conference (DCC) (Year: 2020).*

Zhao et al., "Low-Complexity Intra Prediction Refinements for Video Coding", PCS 2018, pp. 139-143, 2018 (5 pages total).

Zhang et al., "Fast Adaptive Multiple Transform for Versatile Video Coding", 2019 Data Compression Conference (DCC), IEEE, pp. 63-72, 2019 (10 pages total).

International Search Report dated Aug. 3, 2021 from the International Searching Authority in International Application No. PCT/US2021/029604.

Bross et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, JVET-L0283-v2, 12th Meeting: Macao, CN, Oct. 3-12, 2018 (7 pages total).

Chang et al., "Intra prediction using multiple reference lines for the versatile video coding standard", 2019 (8 pages total).

Zhao et al., "CE3-related: Unified MPM list based on CE3-3.3 and CE3-3.5.1 (JVET-N0394)", Tencent, Mar. 2019 (12 pages total).

Zhao et al., "Joint Separable and Non-Separable Transforms for Next-Generation Video Coding", IEEE, 1057-7149 (c), 2018 (13 pages total).

Zhang et al., "Fast DST-7/DCT-8 with Dual Implementation Support for Versatile Video Coding", IEEE Transactions on Circuits and Systems for Video Technology, 1051-8215 (c), pp. 1-17, 2020 (17 pages total).

Written Opinion dated Aug. 3, 2021 from the International Searching Authority in International Application No. PCT/US2021/029604.

Zhao et al., "CE6: On 8-bit primary transform core (Test 6.1.3)", Joint Video Experts Team (JVET) of ITU-T SG 16 WP 3 and ISO/IEC JTC 1/SC 29/WG 11, JVET-L0285-r1, 12th Meeting: Macao, CN, Oct. 3-12, 2018 (18 pages total).

Racapé et al., "CE3-related: Wide-angle intra prediction for non-square blocks", JVET-K0500, 2018 (10 pages total).

Zhao et al., "CE3-related: Unified MPM list based on CE3-3.3 and CE3-3.5.1", Joint Video Experts Team (JVET) of ITU-T SG 16 WP 3 and ISO/IEC JTC 1/SC 29/WG 11, JVET-N0394_r2, 14th Meeting: Geneva, CH, Mar. 19-27, 2019 (25 pages total).

Zhao et al., "Wide Angular Intra Prediction for Versatile Video Coding", 2019 Data Compression Conference (DCC), pp. 53-62, 2019 (10 pages total).

Zhao et al., "NSST: Non-Separable Secondary Transforms for Next Generation Video Coding", 2016 IEEE, 2016 (5 pages total).

Bross et al., "Versatile Video Coding (Draft 6)", Joint Video Experts Team (JVET) of ITU-T SG 16 WP 3 and ISO/IEC JTC 1/SC 29/WG 11, JVET-O2001-vE, 15th Meeting: Gothenburg, SE, Jul. 3-12, 2019 (455 pages total).

Bross et al., Versatile Video Coding (Draft 2), Joint Video Experts Team (JVET) of ITU-T SG 16 WP 3 and ISO/IEC JTC 1/SC 29/WG 11, JVET-K1001-v6, 11th Meeting: Ljubljana, SI, Jul. 10-18, 2018 (141 pages total).

Bross et al., "General Video Coding Technology in Responses to the Joint Call for Proposals on Video Compression with Capability beyond HEVC", IEEE Transactions on Circuits and Systems for Video Technology, pp. 1-16, 2019 (16 pages total).

Zhao et al., CE6: Fast DST-7/DCT-8 with dual implementation support (Test 6.2.3), Joint Video Experts Team (JVET) of ITU-T SG 16 WP 3 and ISO/IEC JTC 1/SC 29/WG 11, JVET-M0497, 13th Meeting: Marrakech, MA, Jan. 9-18, 2019 (11 pages total).

Taoran Lu et al., "Luma Mapping with Chroma Scaling in Versatile Video Coding"; 2020 Data Compression Conference (DCC) (Year: 2020).

Zhao et al., "Coupled Primary and Secondary Transform for Next Generation Video Coding", IEEE, 2018 (4 pages total).

Zhao et al., "Novel Statistical Modeling, Analysis and Implementation of Rate-Distortion Estimation for H.264/AVC Coders", IEEE Transactions on Circuits and Systems for Video Technology, vol. 20, No. 5, May 2010, pp. 647-660 (14 pages total).

Zhao et al., "Non-CE6: Configurable max transform size in VVC" Joint Video Experts Team (JVET) of ITU-T SG 16 WP 3 and ISO/IEC JTC 1/SC 29/WG 11, JVET-O0545-v2, 15th Meeting: Gothenburg, SE, Jul. 3-12, 2019 (6 pages total).

Zhao et al., "CE6-related: Unified LFNST using block size independent kernel", Joint Video Experts Team (JVET) of ITU-T SG 16 WP 3 and ISO/IEC JTC 1/SC 29/WG 11, JVET-O0539-v2, 15th Meeting: Gothenburg, SE, Jul. 3-12, 2019 (19 pages total).

Racapé et al., "CE3-related: Wide-angle intra prediction for non-square blocks", Joint Video Experts Team (JVET) of ITU-T SG 16 WP 3 and ISO/IEC JTC 1/SC 29/WG 11, JVET-K0500_r4, 11th Meeting: Ljubljana, SI, Jul. 10-18, 2018 (16 pages total).

Peter de Rivaz et al."AV1 Bitstream & Decoding Process Specification", 2019 (681 pages total).

* cited by examiner

FURTHER IMPROVEMENT FOR CHROMA MODE CODING

CROSS-REFERENCE TO RELATED APPLICATION

This application is a Continuation Application of U.S. application Ser. No. 17/873,761, filed on Jul. 26, 2022, which is a Continuation Application of U.S. application Ser. No. 16/993,876, filed on Aug. 14, 2020, now U.S. Pat. No. 11,432,006, issued on Aug. 30, 2022, the entireties of which are incorporated herein by reference.

FIELD

This disclosure relates generally to field of data processing, and more particularly to video encoding and/or decoding.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. In AV1, there is a total 56 directional angles, of which 8 are nominal angles and the remainder are specified as a delta from the nominal angles.

SUMMARY

Embodiments relate to a method, system, and computer readable medium for encoding and/or decoding video data. According to one aspect, a method for encoding and/or decoding video data is provided. The method may include receiving video data comprising a chroma component having a first nominal angle and first delta angles and a luma component having a second nominal angle and second delta angles, wherein the first delta angles are dependent on the second delta angles; parsing or deriving first delta angle values corresponding to the first delta angles based at least on second delta values corresponding to the second delta angles, wherein the first delta angle values are derived from one or more nominal angles associated with one or more sample positions corresponding to one or more luma blocks; entropy-coding of a prediction mode associated with the chroma component based on a nominal mode of a corresponding luma block; and decoding the video data based on the first delta angle values corresponding to the first delta angles.

According to another aspect, a computer system for encoding and/or decoding video data is provided. The computer system may include one or more computer-readable non-transitory storage media configured to store computer program code and one or more computer processors configured to access said computer program code and operate as instructed by said computer program code. The program code may include receiving code configured to cause the one or more computer processors to receive video data comprising a chroma component having a first nominal angle and first delta angles and a luma component having a second nominal angle and second delta angles, wherein the first delta angles are dependent on the second delta angles; parsing or deriving code configured to cause the one or more computer processors to parse or derive first delta angle values corresponding to the first delta angles based at least on second delta values corresponding to the second delta angles; entropy code configured to cause the one or more computer processors to entropy-code a prediction mode associated with the chroma component based on a nominal mode of a corresponding luma block; and decoding code configured to cause the one or more computer processors to decode the video data based on the first delta angle values corresponding to the first delta angles.

According to yet another aspect, a non-transitory computer readable medium for encoding and/or decoding video data is provided. The non-transitory computer readable medium may include a computer program for decoding video data, the computer program configured to cause one or more computer processors to receive video data comprising a chroma component having a first nominal angle and first delta angles and a luma component having a second nominal angle and second delta angles, wherein the first delta angles are dependent on the second delta angles; parse or derive first delta angle values corresponding to the first delta angles based at least on second delta values corresponding to the second delta angles; wherein the first delta angle values are derived from one or more nominal angles associated with one or more sample positions corresponding to one or more luma blocks; entropy-code of a prediction mode associated with the chroma component based on a nominal mode of a corresponding luma block; and decode the video data based on the first delta angle values corresponding to the first delta angles.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and/or decode video data using delta angle values derived from nominal angle values. Therefore, some embodiments have the capacity to improve the field of computing by not requiring every delta angle to be signaled and allowing for on-the-fly calculations of delta angle values.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. In AV1, there is a total 56 directional angles, of which 8 are nominal angles and the remainder are specified as a delta from the nominal angles. However, both the nominal angles and the delta angles of all directional modes are signalled for chroma component, regardless of the collocated luma prediction modes. Additionally, delta angles are allowed for both luma and chroma intra prediction modes, but the correlation of the delta angles between luma and chroma component is not used. It may be advantageous, therefore, to derive delta angle values for the chroma component based on nominal angles from the luma component instead of signaling all 56 angle values.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
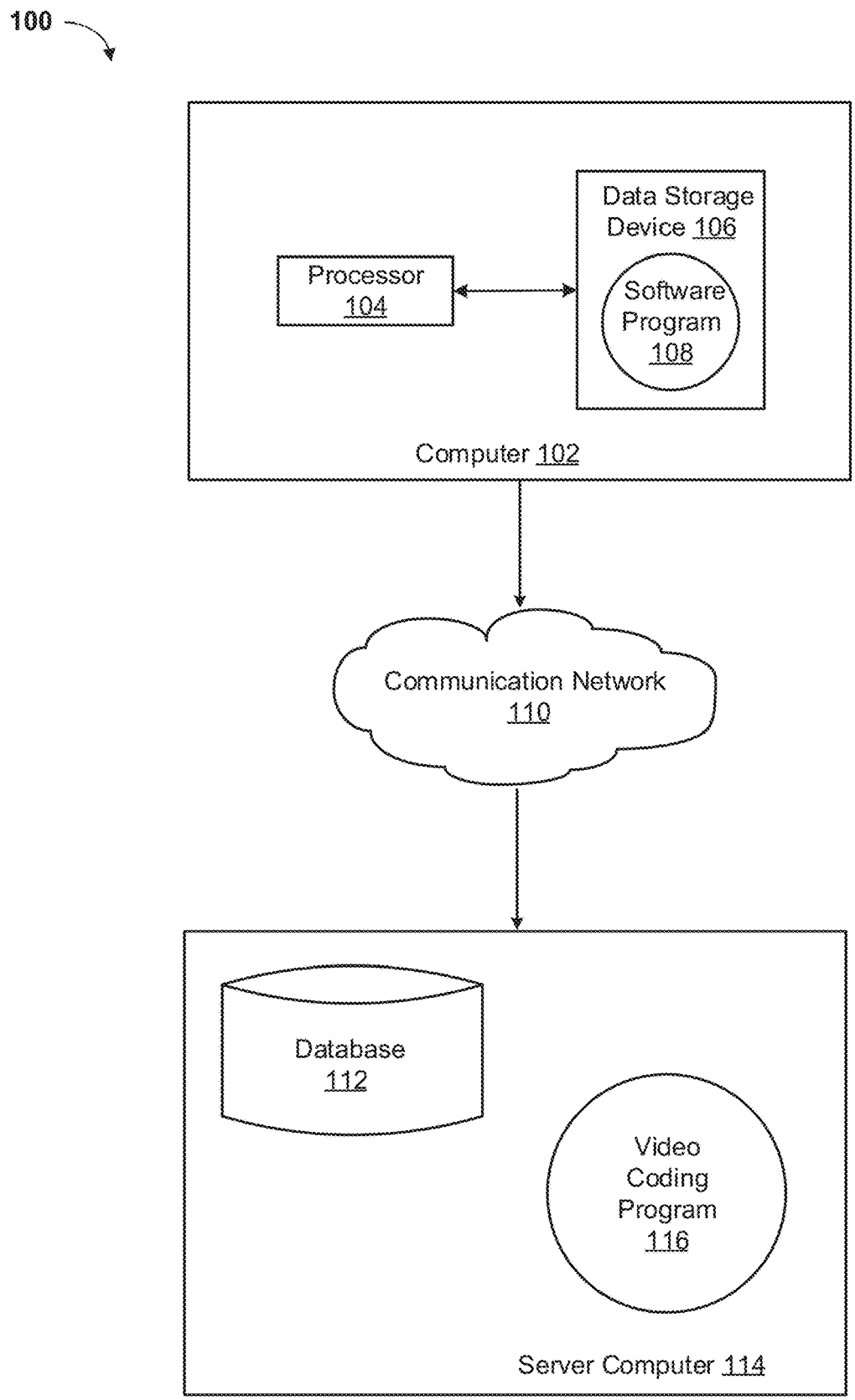
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data using delta angles derived from nominal angles. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 6 and 7. The server computer 114 may also be located in a cloud computing deployment model, such as a private cloud, community cloud, public cloud, or hybrid cloud.

The server computer 114, which may be used for encoding video data is enabled to run a Video Coding Program 116 (hereinafter "program") that may interact with a database 112. The Video Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
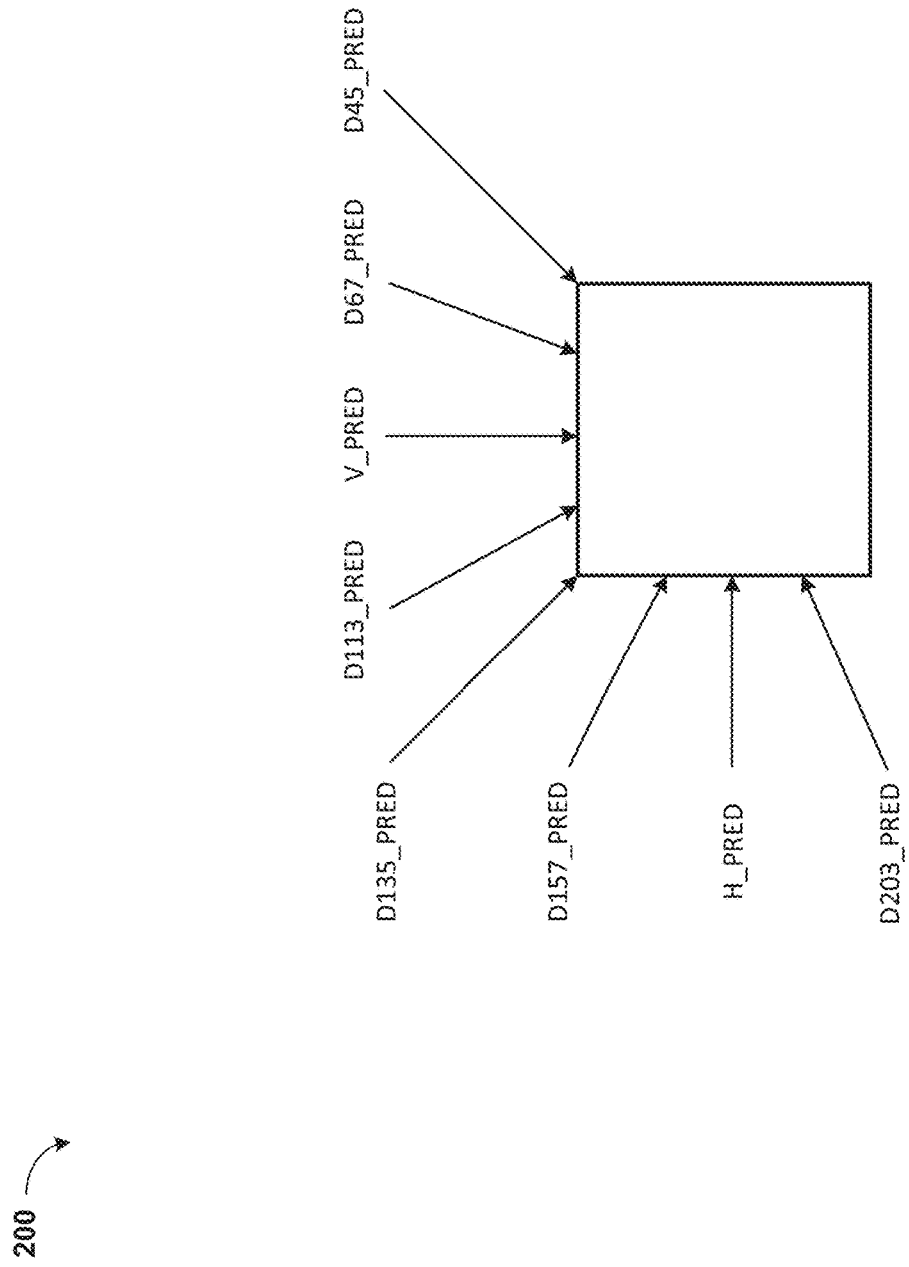
FIG. 2 is a diagram of the nominal angles of AV1, according to at least one embodiment.

Referring now to FIG. 2, a diagram 200 illustrating nominal angles of AV1 is depicted. In AV1, there are 8 nominal angles between 45 and 207 degrees that may include V_PRED, H_PRED, D45_PRED, D135_PRED, D113_PRED, D157_PRED, D203_PRED, and D67_PRED. For each nominal angle, there may be 7 finer angles, such that AV1 may have 56 directional angles in total. The prediction angle may be represented by a nominal intra angle plus an angle delta, which is −3~3 multiplies the step size of 3 degrees. The delta angles may not need to be signaled by the chroma component but may instead by derived according to the corresponding luma intra prediction modes.

In one or more embodiments, when the current chroma intra prediction mode is directional intra prediction mode and the nominal angle of the chroma intra prediction mode is equal to that of corresponding luma intra prediction mode, then the delta angle of the chroma component may be set equal to the delta angle of luma intra prediction mode. Otherwise, the delta angle of the chroma component may be set equal to 0.

In one or more embodiments, the delta angle of the chroma component may be set equal to the delta angle of the luma component, regardless of whether the nominal mode between luma and chroma is same or not.

In one or more embodiments, when the current chroma intra prediction mode is directional intra prediction mode and the nominal angle of the chroma intra prediction mode is equal to that of corresponding luma intra prediction mode, then the delta angle of the chroma component may be set equal to the delta angle of luma intra prediction mode. Otherwise, when the nominal angle of the chroma intra prediction mode is equal to the left/above neighboring modes of the corresponding luma block, then the delta angle of the chroma component may be set equal to that of left/above neighboring modes of the corresponding luma block. Otherwise, the delta angle of the chroma component may be set equal to 0.

In one or more embodiments, when semi-decoupled partitioning is applied, there may be multiple luma blocks associated with one chroma block. Therefore, multiple sample positions may be pre-defined, and the delta angles and nominal angles associated with these positions for predicting the co-located luma block may be identified. One or more of these identified nominal angles and delta angles may be used to derive the delta angles of current chroma block. In one example, the pre-defined sample positions may include the top-left and/or the center/middle samples. In another example, the pre-defined sample positions may include the four corner samples and the center/middle sample. In another example, the delta angles that may be used most frequently among the identified prediction modes may be used to derive the derive the delta angles of the chroma component. In another example, the pre-defined sample positions may include two selected positions of the four corner samples and one center/middle sample. In another example, the pre-defined sample positions may include three selected positions of the four corner samples and one center/middle sample.

In one or more embodiments, when the current chroma intra prediction mode is directional intra prediction mode and the nomimal angle of the chroma intra prediction mode is equal to that of corresponding luma intra prediction mode, then the delta angle of the chroma component may be set equal to the delta angle of luma intra prediction mode. Otherwise, when the nominal angle of the chroma intra prediction mode is equal to the left/above neighboring modes of current chroma block, then the delta angle of the chroma component may be set equal to that of left/above neighboring modes of current chroma block. Otherwise, the delta angle of the chroma component may be set equal to 0.

The delta angle of the corresponding luma block may be used for the entropy coding of the delta angles of chroma intra prediction modes. In one or embodiments, the delta angle of the co-located luma blocks may be used as the context for the entropy coding of the delta angles of the chroma component. In one or more embodiments, the delta angle of the neighboring chroma blocks is used as the context for the entropy coding of the delta angles of the chroma component. In one or embodiments, instead of signaling the delta angles of the current chroma block, the absolute difference between delta angles of chroma blocks and the corresponding luma blocks may be signaled for the entropy coding of the chroma intra prediction modes. In one or more embodiments, the above embodiments are applied only when the nominal mode between luma and chroma may be same or when the absolute difference of prediction angles between these two modes is within a given threshold.

According to one or more embodiments, for entropy coding of the chroma intra prediction modes, a first flag may be signaled to indicate whether or not the current mode is chroma-from-luma (CfL). If the first flag is signaled as a value indicating CfL is not being used, a second flag may be signaled to indicate whether the current mode may be equal to the nominal mode of the corresponding luma block. If the current mode is equal to the nominal mode of the corresponding luma block, current mode is directional mode, and delta angles are allowed, then a third flag may be signaled to indicate the index of the delta angles. Otherwise, the third flag is signaled to indicate which of the remaining nominal modes current mode is. If the first flag is signaled as a value indicating CfL is not being used, the parameters of the CfL mode may be further signaled.

According to one or more embodiments, for entropy coding of the chroma intra prediction modes, the first flag may be signaled to indicate whether current mode may be equal to the nominal mode of the corresponding luma block or CfL mode. If the first flag is signaled as a value indicating the current mode is equal to the nominal mode of the corresponding luma block or CfL mode, the second flag may be signaled to indicate which of the two modes may be the current mode. If the current mode is equal to the nominal mode of the corresponding luma block, the current mode is directional mode, and delta angles are allowed, then the index of the delta angles may be further signaled. If the current mode is CfL mode, the parameters of the CfL mode may be further signaled. If the first flag is signaled as a value indicating the current mode is not equal to the nominal mode of the corresponding luma block or CfL mode, the second flag may be signaled to indicate which of the remaining nominal modes may be applied for the current chroma block.

In one or more embodiments, the first delta angle values may be entropy-coded based on using a delta angle of co-located luma blocks as a context in response to the nominal angle of the chroma component and the nominal angle of the luma component being the same or close to each other. The nominal angles may be close to each other when a difference of the between the nominal angles is less than or equal to 2 degrees. The delta angle values may be entropy-coded based on using a delta angle of co-located luma blocks as a context or based on using a delta angle of neighboring chroma blocks as a context.

Figure 3:
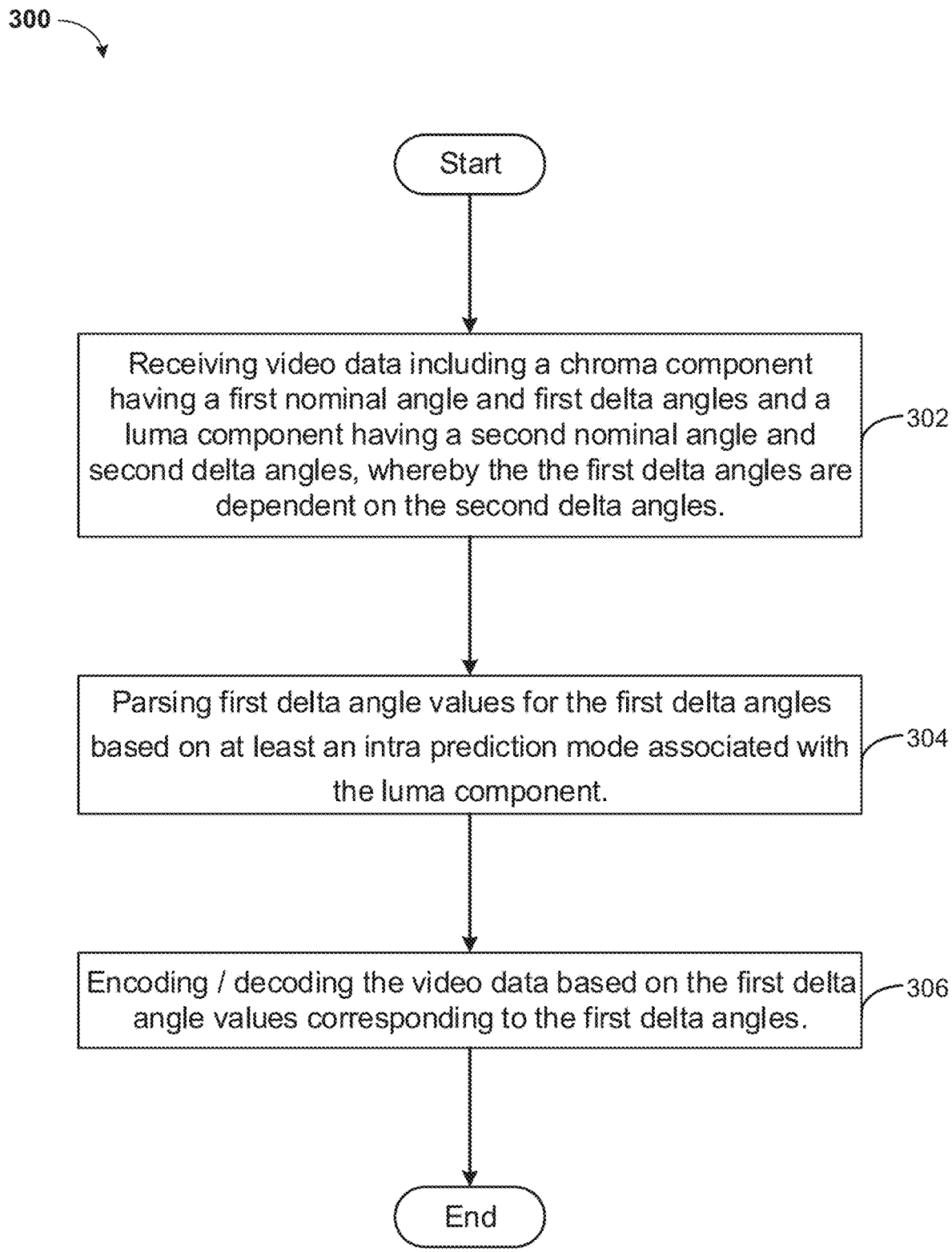
FIG. 3 is an operational flowchart illustrating the steps carried out by a program that codes video data, according to at least one embodiment.

It may be appreciated that, in one or more embodiments, the delta angles of luma and chroma blocks may use the separate contexts for entropy coding instead of sharing the same context among the delta angles of the luma and chroma blocks Referring now to FIG. 3, an operational flowchart illustrating the steps of a method 300 for encoding and/or decoding video data is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes receiving video data including (1) a chroma component having a first nominal angle and first delta angles and (2) a luma component having a second nominal angle and second delta angles. The first delta angles are dependent on the second delta angles.

At 304, the method 300 includes parsing first delta angle values for the first delta angles based on at least an intra prediction mode associated with the luma component.

At 306, the method 300 includes encoding and/or decoding the video data based on the first delta angle values corresponding to the first delta angles.

It may be appreciated that FIG. 3 provides only an illustration of one implementation and does not imply any limitations with regard to how different embodiments may be implemented. Many modifications to the depicted environments may be made based on design and implementation requirements.

Figure 4:
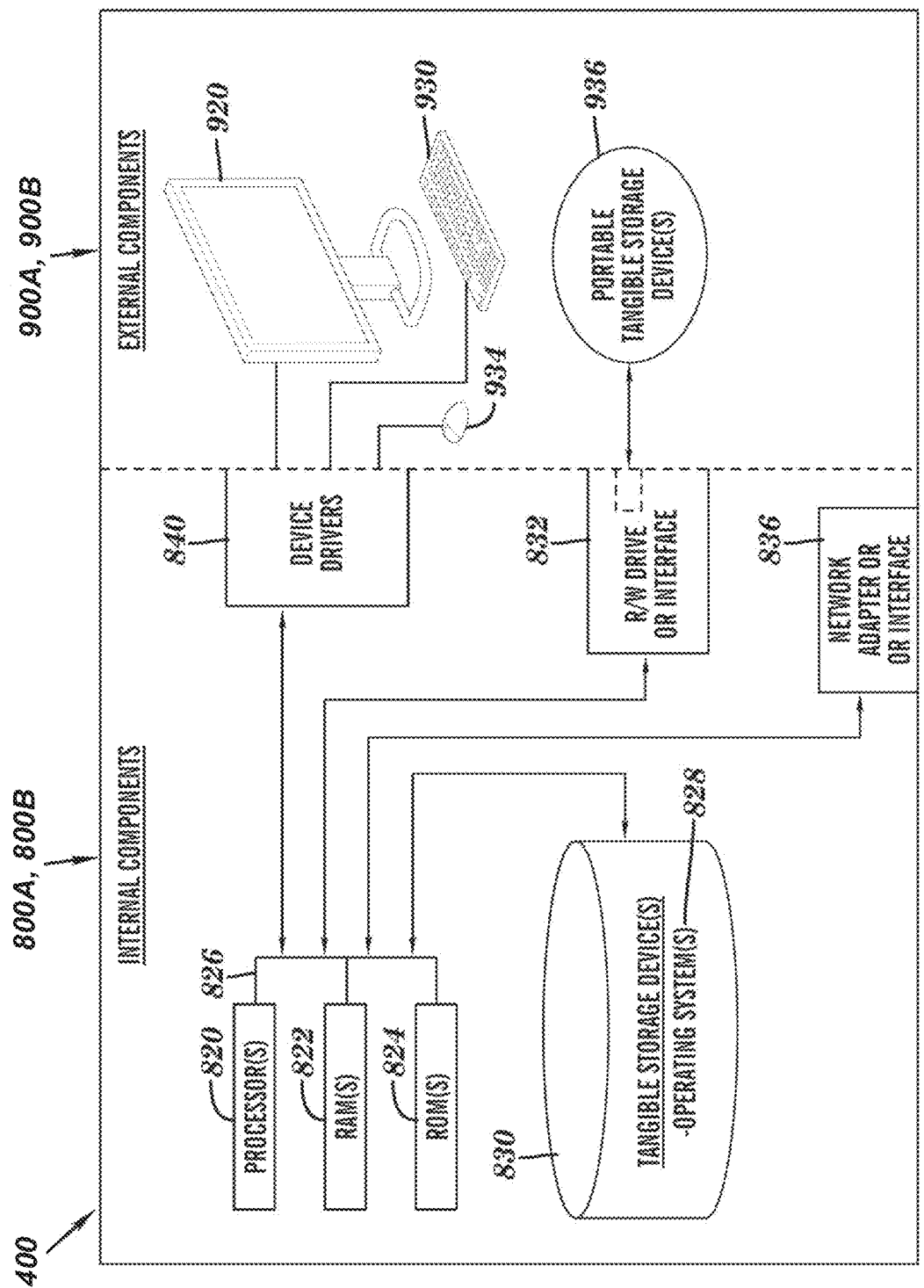
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective RAY drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
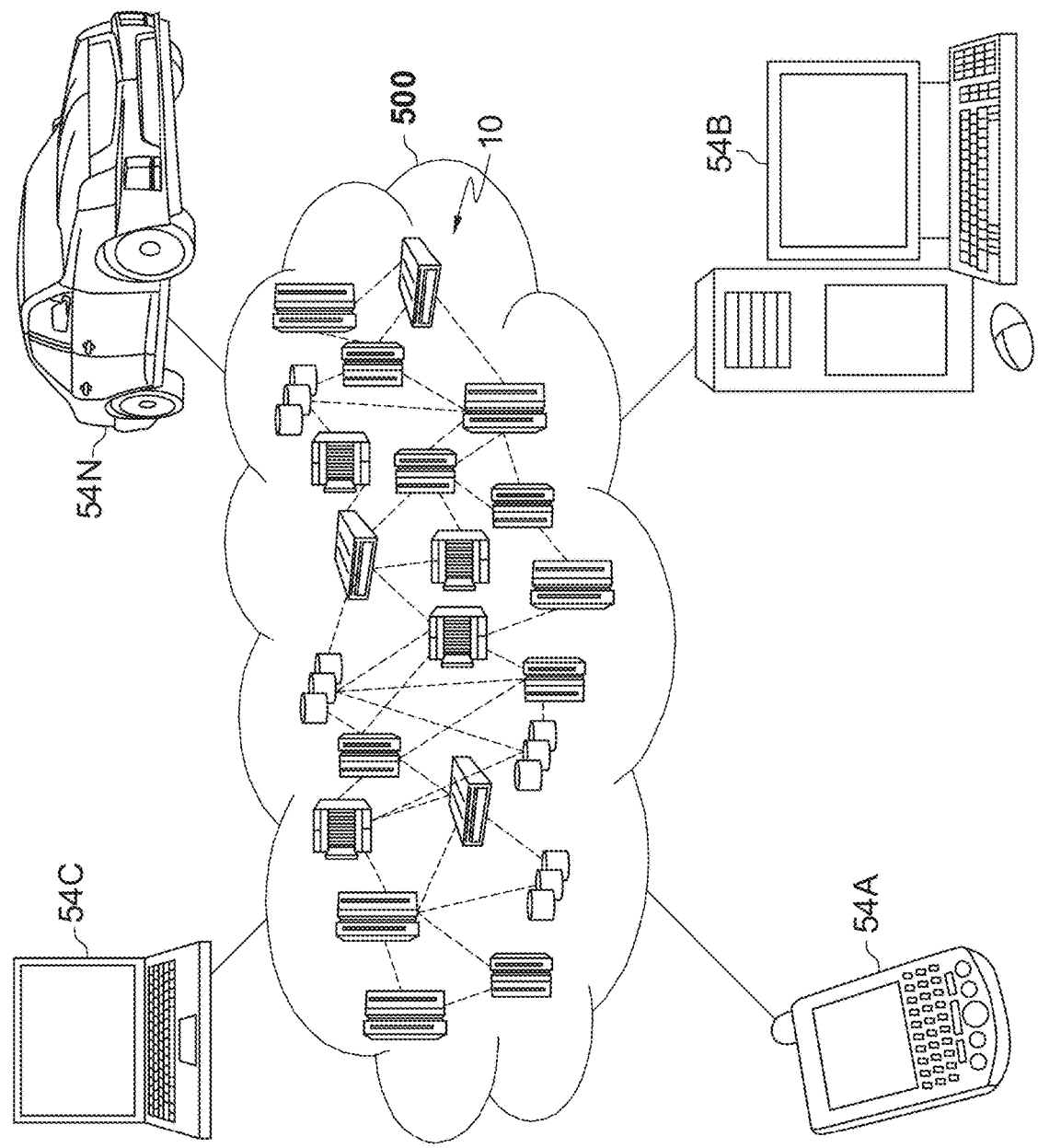
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
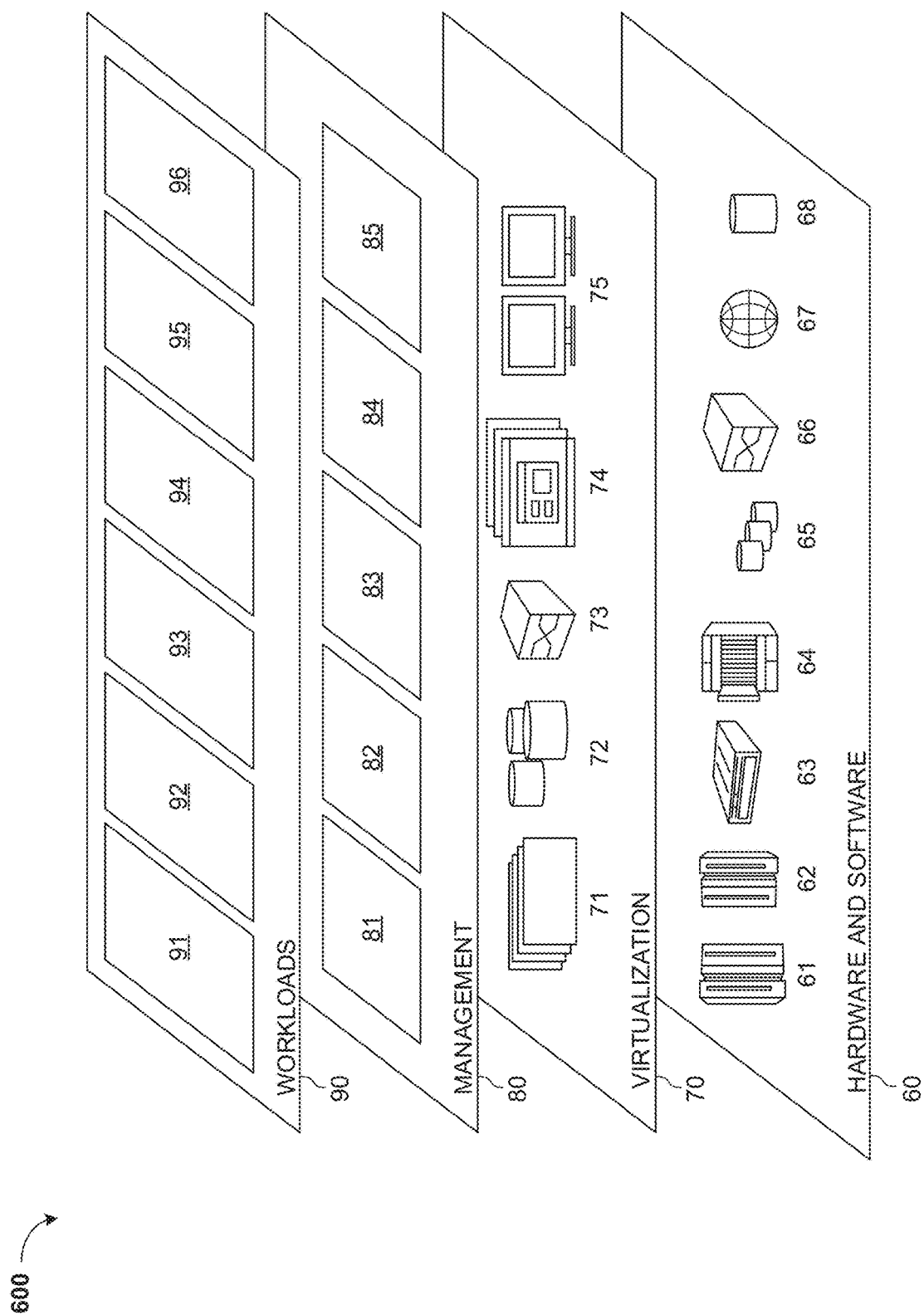
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video encoding a video data, executable by a processor, the method comprising:
    setting a first flag associated with a current block, wherein the first flag indicates whether a current mode is equal to a chroma from luma (CfL) mode;
    based on the first flag indicating that the current mode is not equal to the CfL mode, setting a second flag associated with the current block, wherein the second flag indicates whether the current mode is equal to a nominal mode of a luma block associated with the current block;
    setting additional information, the additional information being one of: an index of delta angles, one or more parameters of the CfL mode, or one or more remaining nominal modes associated with the current block based on a value of the second flag; and
    encoding a chroma intra prediction mode associated with the current block based on the first flag, the second flag, and the additional information.

2. The method of claim 1, wherein based on the second flag indicating that the current mode is equal to the nominal mode of the luma block associated with the current block, the method further comprises determining that the current mode is a directional mode.

3. The method of claim 2, wherein based on determining that the current mode is the directional mode, the additional information that is signaled is the index of delta angles.

4. The method of claim 3, wherein contexts used to signal the index of delta angles comprise first contexts for delta angles of luma blocks and second contexts for delta angles of chroma blocks.

5. The method of claim 4, wherein the first contexts are different from the second contexts.

6. The method of claim 1, wherein based on the second flag indicating that the current mode is not equal to the nominal mode of the luma block associated with the current block, the additional information that is signaled is the one or more remaining nominal modes associated with the current block.

7. The method of claim 1, wherein based on the first flag indicating that the current mode is equal to the CfL mode, the additional information that is signaled is the one or more parameters of the CfL mode.

8. A computer system for decoding video data, the computer system comprising:
    one or more computer-readable non-transitory storage media configured to store computer program code; and
    one or more computer processors configured to access said computer program code and operate as instructed by said computer program code, said computer program code including:
        first setting code configured to cause the one or more computer processors to set a first flag associated with a current block, wherein the first flag indicates whether a current mode is equal to a chroma from luma (CfL) mode;
        based on the first flag indicating that the current mode is not equal to the CfL mode, second setting code configured to cause the one or more computer processors to set a second flag associated with the current block, wherein the second flag indicates whether the current mode is equal to a nominal mode of a luma block associated with the current block;
        third setting code configured to cause the one or more computer processors to set additional information, the additional information being one of: an index of delta angles, one or more parameters of the CfL mode, or one or more remaining nominal modes associated with the current block based on a value of the second flag; and
        encoding code configured to cause the one or more computer processors to encode a chroma intra prediction mode associated with the current block based on the first flag, the second flag, and the additional information.

9. The apparatus of claim 8, wherein based on the second flag indicating that the current mode is equal to the nominal mode of the luma block associated with the current block, the program code further comprises determining code configured to cause the one or more computer processors to determine that the current mode is a directional mode.

10. The apparatus of claim 9, wherein based on determining that the current mode is the directional mode, the additional information that is signaled is the index of delta angles.

11. The apparatus of claim 10, wherein contexts used to signal the index of delta angles comprise first contexts for delta angles of luma blocks and second contexts for delta angles of chroma blocks.

12. The apparatus of claim 11, wherein the first contexts are different from the second contexts.

13. The apparatus of claim 8, wherein based on the second flag indicating that the current mode is not equal to the nominal mode of the luma block associated with the current block, the additional information that is signaled is the one or more remaining nominal modes associated with the current block.

14. The apparatus of claim 8, wherein based on the first flag indicating that the current mode is equal to the CfL mode, the additional information that is signaled is the one or more parameters of the CfL mode.

15. A non-transitory computer readable medium having stored thereon a computer program for encoding video data, the computer program configured to cause one or more computer processors to:
   generate a bitstream of a visual media data according to an encoding process,
   wherein the bitstream comprises:
   a first flag associated with a current block, wherein the first flag indicates whether a current mode is equal to a chroma from luma (CfL) mode;
   a second flag associated with the current block based on the first flag indicating that the current mode is not equal to the CfL mode, wherein the second flag indicates whether the current mode is equal to a nominal mode of a luma block associated with the current block;
   additional information, the additional information being one of: an index of delta angles, one or more parameters of the CfL mode, or one or more remaining nominal modes associated with the current block based on a value of the second flag; and
   encode a chroma intra prediction mode associated with the current block based on the first flag, the second flag, and the additional information in the generated bitstream.

16. The non-transitory computer readable medium of claim 15, wherein based on the second flag indicating that the current mode is equal to the nominal mode of the luma block associated with the current block, the computer program configured to further cause one or more computer processors to determine that the current mode is a directional mode.

17. The non-transitory computer readable medium of claim 16, wherein based on determining that the current mode is the directional mode, the additional information that is signaled is the index of delta angles.

18. The non-transitory computer readable medium of claim 17, wherein contexts used to signal the index of delta angles comprise first contexts for delta angles of luma blocks and second contexts for delta angles of chroma blocks.

19. The non-transitory computer readable medium of claim 18, wherein the first contexts are different from the second contexts.

20. The non-transitory computer readable medium of claim 15, wherein based on the second flag indicating that the current mode is not equal to the nominal mode of the luma block associated with the current block, the additional information that is signaled is the one or more remaining nominal modes associated with the current block.

* * * * *